United States Patent
Watabe et al.

(10) Patent No.: US 6,987,714 B2
(45) Date of Patent: Jan. 17, 2006

(54) DISK, DISK DEVICE AND TRACK CENTER DETECTION METHOD

(75) Inventors: Kazuo Watabe, Yokohama (JP); Chosaku Noda, Kawasaki (JP); Masaaki Matsumaru, Funabashi (JP)

(73) Assignee: Kabushiki Kaisha Toshiba, Tokyo (JP)

(*) Notice: Subject to any disclaimer, the term of this patent is extended or adjusted under 35 U.S.C. 154(b) by 419 days.

(21) Appl. No.: 10/125,481

(22) Filed: Apr. 19, 2002

(65) Prior Publication Data

US 2002/0154584 A1 Oct. 24, 2002

(30) Foreign Application Priority Data

Apr. 20, 2001 (JP) .................................... 2001-122887

(51) Int. Cl.
*G11B 7/095* (2006.01)

(52) U.S. Cl. .................. 369/44.34; 369/44.41; 369/275.3; 369/53.28

(58) Field of Classification Search .............. 369/44.41, 369/275.3, 275.4, 44.26, 44.34, 53.28
See application file for complete search history.

(56) References Cited

U.S. PATENT DOCUMENTS

| | | | | |
|---|---|---|---|---|
| 4,748,609 A | * | 5/1988 | Yonezawa et al. | 369/44.13 |
| 4,998,234 A | * | 3/1991 | Rees et al. | 369/44.27 |
| 5,568,456 A | * | 10/1996 | Hayashi et al. | 369/124.01 |
| 6,349,011 B1 | * | 2/2002 | Choi | 360/77.13 |
| 2002/0031059 A1 | * | 3/2002 | Nishida et al. | 369/44.28 |

FOREIGN PATENT DOCUMENTS

| | | |
|---|---|---|
| JP | 01-211247 | 8/1989 |
| JP | 05-250746 | 9/1993 |
| JP | 06-203411 | 7/1994 |
| JP | 7-302428 | 11/1995 |
| JP | 09-161274 | 6/1997 |
| JP | 9-282667 | 10/1997 |

OTHER PUBLICATIONS

English Translation of JP 09161274.*

* cited by examiner

*Primary Examiner*—William Klimowicz
*Assistant Examiner*—Peter Vincent Augustin
(74) *Attorney, Agent, or Firm*—Oblon, Spivak, McClelland, Maier & Neustadt, P.C.

(57) ABSTRACT

Header regions are formed by dividing a groove or grooves. Each of the header regions is provided with two ID sections G-ID1, G-ID2 storing address information and a track center detection mark section, arranged between the two ID sections, so as to be used for detecting the track center.

6 Claims, 7 Drawing Sheets

DISK, DISK DEVICE AND TRACK CENTER DETECTION METHOD

CROSS-REFERENCE TO RELATED APPLICATIONS

This application is based upon and claims the benefit of priority from the prior Japanese Patent Application No. 2001-122887, filed Apr. 20, 2001, the entire contents of which are incorporated herein by reference.

BACKGROUND OF THE INVENTION

1. Field of the Invention

This invention relates to a disk, a disk device and a track center detection method. More particularly, the present invention relates a disk, a disk device and a track center detection method adapted to define and detect a track center.

2. Description of the Related Art

DVD-RAMs are among typical products of the recently developed technologies of digital versatile disks (DVD). A DVD-RAM is provided with addresses realized in the form of pre-pits that are allocated to the sectors thereof on a one by one basis. The addresses are referred to as complementary allocated pit addresses (CAPAs). With a system using CAPAs, the center of the track of pre-pit header fields and the center of the track of fields where user data is recorded are displaced in opposite directions by a half of the pitch of the track arrangement.

The amplitude of each of the signals reproduced from two groups of header fields (the amplitude of the signal of the sum of the quantities of reflected light beams) is used for detecting the center of the track thereof. The two groups of header fields are displaced in opposite directions by a half of the pitch of the track arrangement relative to the center of the track of the recording fields. The center signal representing the center of the track is extracted from the amplitudes of the reproduced signals.

More specifically, a track center signal is generated on the basis of the difference between the amplitude of the VFO (variable frequency oscillator) signal in a group of header fields displaced to a side from the track center by a half of the pitch of the track arrangement and that of the VFO signal in a corresponding group of header fields displaced to the other side from the track center by a half of the pitch of the track arrangement. With this method, if the signal reproducing beam traces the center of the track of the recording field, the amplitudes of the two reproduced VFO signals are substantially equal to each other because the two groups of head fields are displaced in opposite directions by the same distance. Then, the difference, or the value of the track center signal, is substantially equal to 0.

When the pre-pits of a pair of groups of header fields are arranged symmetrically at the opposite sides, as in the case of DVD-RAMs, a center signal is generated by using the difference of the amplitudes of the two reproduced signals as described above.

However, from the viewpoint of the efficiency of simply reproducing the signals from the header fields, it is highly efficient when the signal reproducing light beam traces exactly above the pre-pits. It is highly efficient too, from the viewpoint of stability of the operation of signal reproduction, because the offset margin of the two amplitudes is large.

BRIEF SUMMARY OF THE INVENTION

Therefore, it is an object of the present invention to provide a disk which can provide a secure reproduction signal from header fields.

One aspect of the invention is to provide an optical disk having tracks and adapted to record information on the tracks and reproduce information from the tracks, the optical disk comprising: header regions formed by dividing the tracks; a track center detection section formed in each of the header regions, the track center detection section including a track center detection mark; two ID sections formed before and after the track center detection section, the two ID sections each having address information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present invention will be described by referring to the accompanying drawings that illustrate preferred embodiments of the invention.

Figure 1:
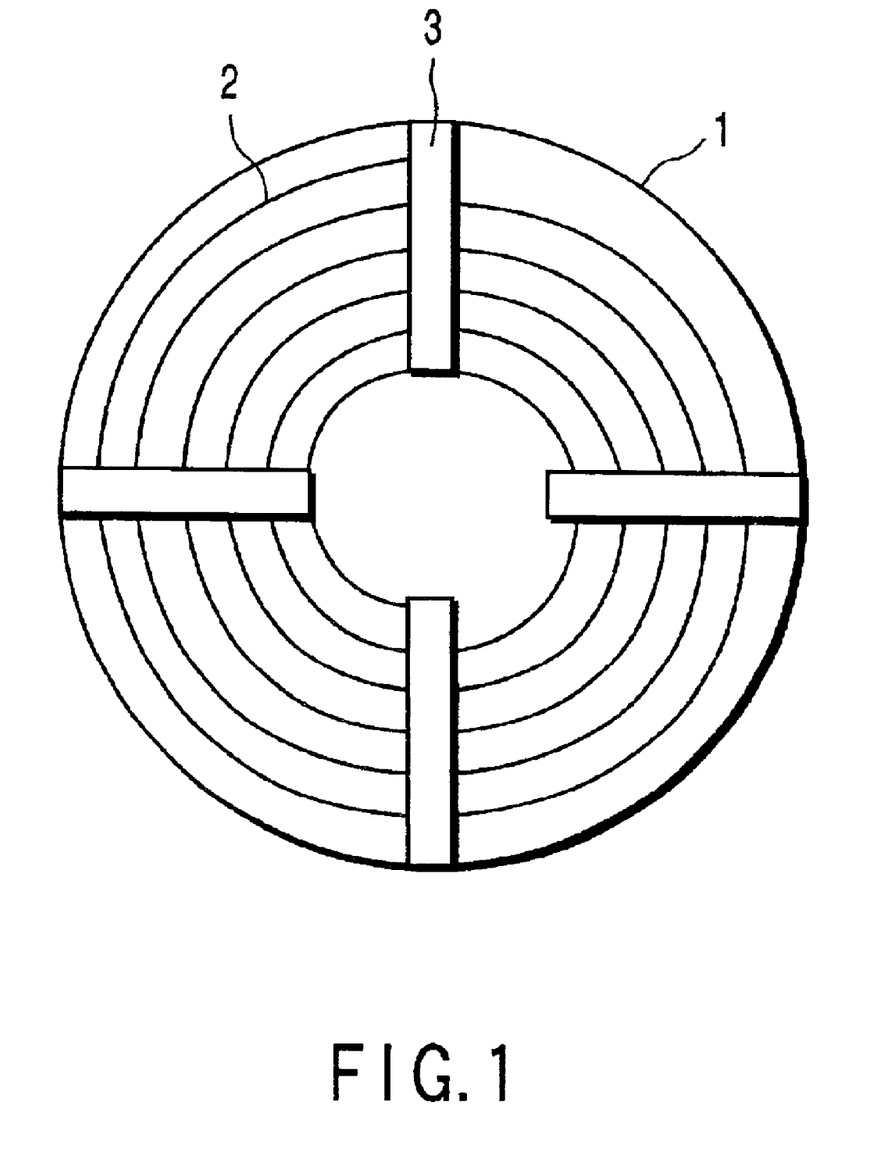
FIG. 1 is a schematic illustration of an embodiment of an optical disk according to the invention.

FIG. 1 is a schematic illustration of an embodiment of the optical disk 1 according to the invention. Referring to FIG. 1, the optical disk 1 has tracks 2, tracks 2 is a number of turns of spiral groove and land or a number of turns of concentric grooves and lands. Several header regions 3 are provided on divided portions of the track 2.

Figure 2:
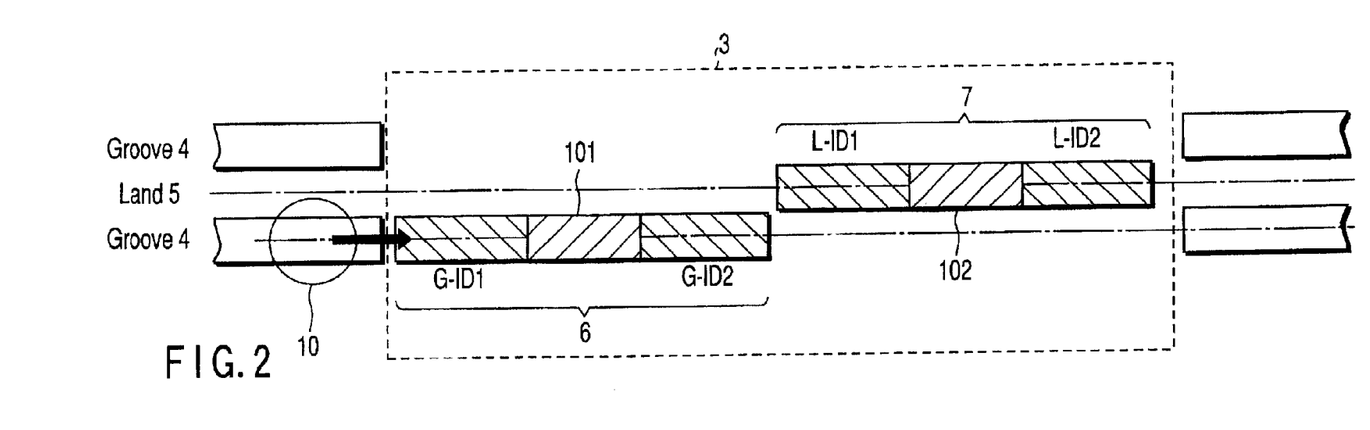
FIG. 2 is an enlarged schematic view of a header region 3 of the optical disk of FIG. 1.

FIG. 2 is an enlarged schematic view of a header region 3 and its vicinity. Note that a data recording format referred to as "land & groove" will be described for this embodiment of disk 1. In the land & groove recording format, user data is recorded in both the guide grooves 4 and the areas separating the guide grooves (lands) 5. However, the present invention is not limited to this data recording format. It will be equally effective if it is used with other data recording format with which user data is recorded only on the grooves 4 or the lands 5.

Each of the header regions has groove ID sections 6 located on the respective groove tracks 4 and land ID sections 7 located on the respective lands 5. The sector ID number of each sector is recorded for a plurality of times in each of the groove ID sections 6 and the land ID sections 7 in order to improve the reliability of reading the data of the section.

The ID is recorded twice in each of the groove ID section 6 and the land ID section 7 of FIG. 2. They are denoted respectively by groove IDs (G-ID1) and (G-ID2) and land IDs (L-ID1) and (L-ID2). A track center detection mark to be used for detecting the track center is arranged between each of the pairs of IDs. More specifically, track center detection mark 101 is arranged between the groove IDs (G-ID1) and (G-ID2) and track center detection mark 102 is arranged between the land IDs (L-ID1) and (L-ID2).

One of the advantages of this sort of arrangement is that one of the pair of IDs may possibly be read if the groove or the land carrying the IDs is damaged beyond recovery for a given length and the two IDs are separated from each other by a long distance.

Figure 3A:
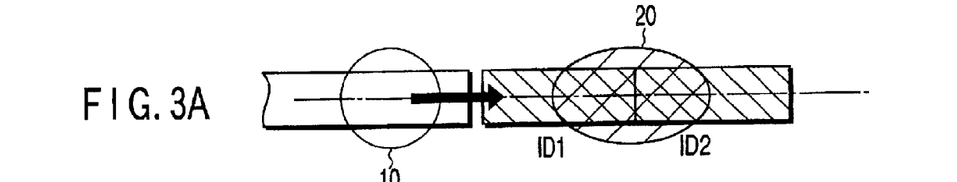
FIGS. 3A and 3B are enlarged schematic views of a principal part of an optical disk for illustrating the configuration of an optical disk according to the invention.
Figure 3B:
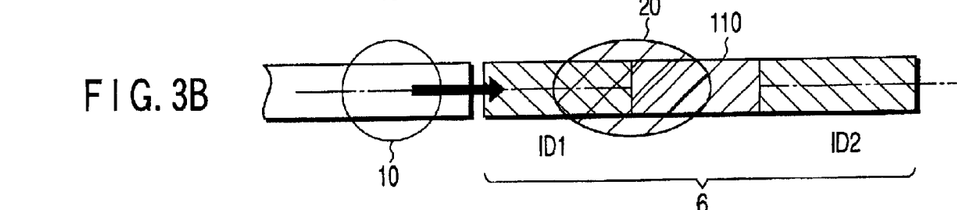

Assume that a region 20 of the disk is damaged beyond recovery due to a scratch or dust, as shown in FIG. 3A. The region 20 damaged beyond recovery covers both the ID1 section and the ID2 section and hence the information in both of the ID sections may possibly not be read. On the other hand, if a track center detection mark 110 is arranged between the two ID sections of the ID section ID1 and the ID section ID2 as shown in FIG. 3B and the same region 20 is damaged beyond recovery, only the ID1 section and the track center detection mark 110 are damaged beyond recovery. Therefore, the information in the ID section of ID2 can be retrieved.

Thus, the arrangement of introducing track detection marks 110 in the manner shown in FIG. 3B according to the invention is advantageous in the arrangement of FIG. 3A, from the viewpoint of reproducing the sector number of each header region. For data to be recorded in and reproduced from an optical disk successfully, one of the basic requirements to be met is to reliably reproduce the IDs recorded on the disk. In other words, it is very important that the probability of the IDs being reproduced from the disk is high, from the being viewpoint of reliability of recording/reproducing data and that of raising the data recording/reproducing rate.

While two equivalent IDs are written for each track of the header region 3 in the above instance, it will be appreciated that three or more than three same IDs may be recorded for each track of the header region 3. In short, the above identified advantage of the present invention can be realized by arranging a track center detection mark between two adjacent equivalent IDs.

Now, an optical disk according to the invention will be described in greater detail.

Figure 4:
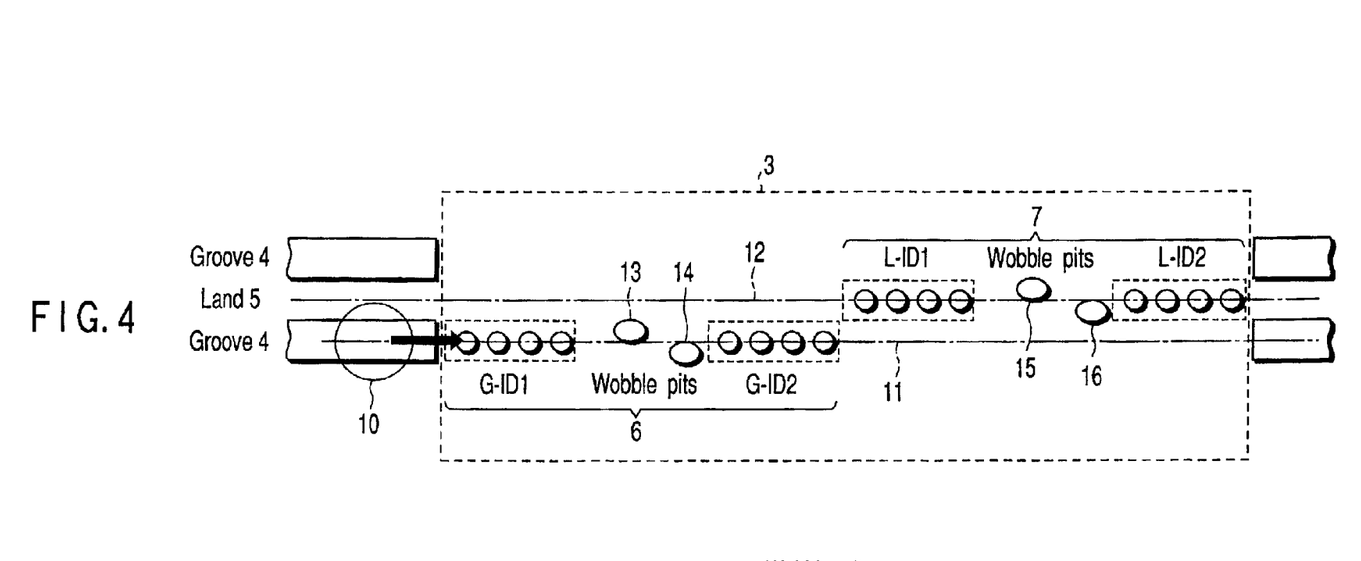
FIG. 4 is an enlarged schematic view of a principal part of an optical disk according to the invention.

FIG. 4 is an enlarged schematic view of a principal part of an embodiment of an optical disk according to the invention. In header region 3, a groove ID section 6 comprising pre-pits is arranged on the center line 11 of groove track 4, whereas land ID section 7 comprising pre-pits is arranged on the center line 12 of land track 5.

Two equivalent IDs are recorded on the groove ID section 6 and two equivalent IDs are recorded on the land ID section 7 in order to secure a high data reading probability. More specifically, the IDs recorded on the groove ID section 6 are groove IDs (G-ID1), (G-ID2) and the IDs recorded on the land ID section 7 are land IDs (L-ID1), (L-ID2). Each ID is recorded in the form of a row of pre-pits and the center line of the row of pre-pits of each groove ID substantially agree with the center line 11 of the groove, while the center line of the row of pre-pits of each land ID substantially agree with the center line 12 of the land.

A beam 10 is irradiated to scan the disk along the center line of a groove 4 or a land 5 under the control of a servo control system in order to record data on or reproduce data from there (to be referred to as a signal recording/reproducing beam hereinafter). The signal reproduction system is added to bold the track position immediately before a header region 3 that divides a groove and a land. In other words, the signal recording/reproducing beam 10 scans the center line of the groove 4 or the land 5 in the header region 3 and hence the center line of the row of pre-pits in the ID section of the groove or the land, whichever is appropriate. The amplitude of the signal reproduced from the row of pre-pits becomes largest when the signal reproducing beam scans right along the center line of the pre-pits. Therefore, the pre-pits of an ID section of this embodiment can be expected to be reproduced with a sufficient degree of modulation.

Referring to FIG. 4, pre-pits 13, 14 are formed between the two IDs of the groove ID section 6. The pre-pits 13, 14 are radially displaced in opposite directions from the center line 11 of the groove. Similarly, pre-pits 15, 16 are formed between the two IDs of the land ID section 7. The pre-pits 15, 16 are also radially displaced in opposite directions from the center line 12 of the land. These pre-pits are also referred to as wobble pits hereinafter.

Figure 5:
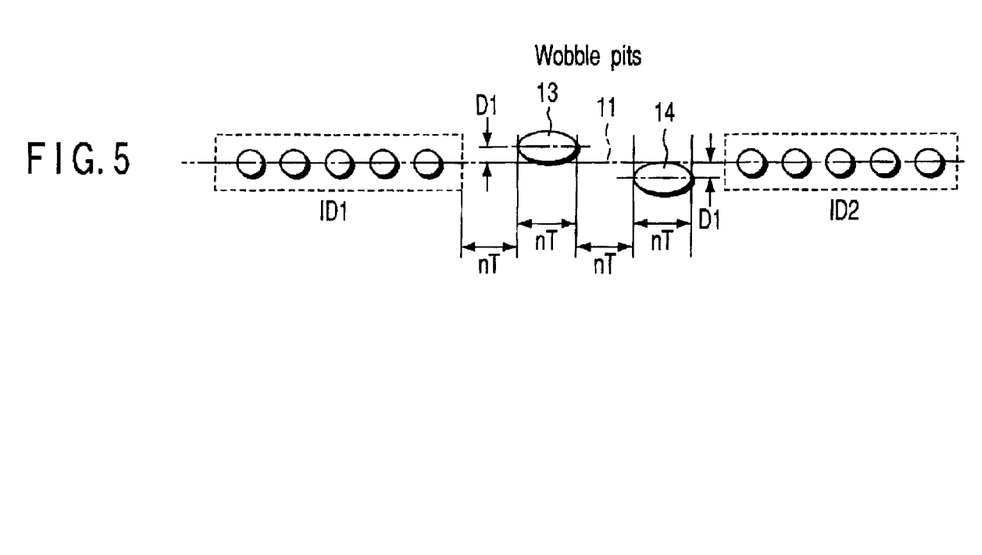
FIG. 5 is a detailed schematic illustration of wobble pits that can be used for the purpose of the invention.

FIG. 5 is a detailed illustration of the wobble pits section. In FIG. 5, the pre-pit 13 is displaced upwardly by distance D1 from the center line 11. On the other hand, the pre-pit 14 is displaced downwardly also by distance D1 from the center line 11. The effect of the pre-pits 13, 14 will be the same if they are displaced inversely. In other words, the pre-pit 13 may be displaced downwardly and the pre-pit 14 may be displaced upwardly in FIG. 5.

Both the pre-pit 13 and 14 have the same length, nT, where T represents the channel bit length and n represents an integer. While the actual value of n may depend on the modulation method used for data, a sufficient signal amplitude may not be secured if the smallest value defined by the modulation method (for example, 3 if the 8–16 modulation method is used) is selected. Then, a sufficiently large signal amplitude can be secured if 7 is selected for n.

A space having a length nT is provided immediately before the pre-pit 13 and immediately before the pre-pit 14. No pre-pit is formed in these spaces. In other words, a wobble pit section is formed by arranging an nT space, an nT pit, an nT space and an nT space. A similar space may be provided immediately after the pre-pit 13 or 14. The effect of providing such a space will be the same. The land ID section 7 also has a similar arrangement of pre-pits and spaces.

Figure 6A:
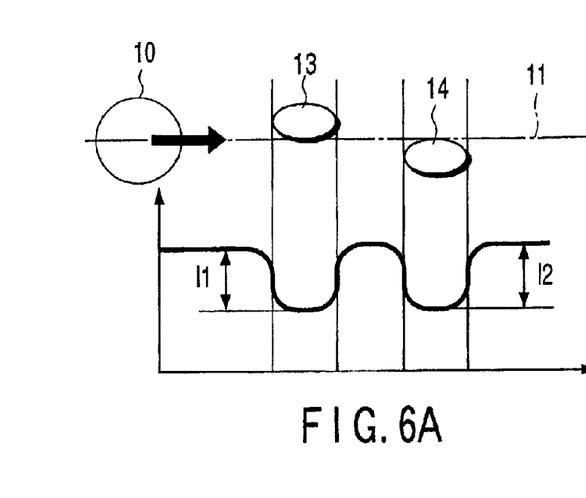
FIGS. 6A and 6B are schematic illustrations of wobble pits and signals that can be reproduced from the wobble pits.
Figure 6B:
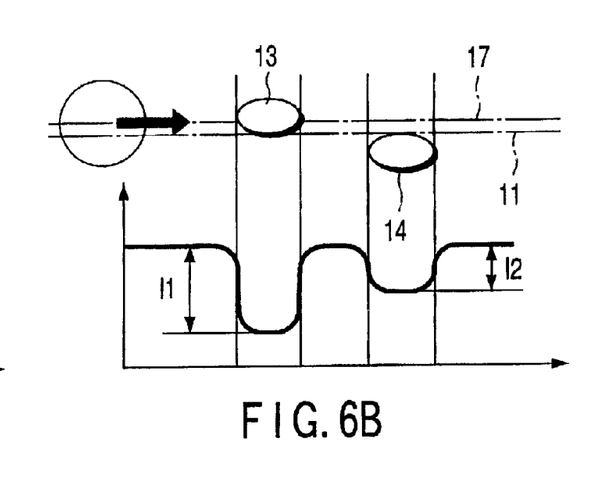

Each of FIGS. 6A and 6B shows signals to be reproduced from the wobble pits. In each of FIGS. 6A and 6B, the upper half shows wobble pits and the lower half shows corresponding signals to be reproduced from the wobble pits respectively.

Signals as shown in FIG. 6A are obtained when the signal reproducing beam 10 traces exactly the center line 11. In FIG. 6A, the first space, the amplitude I1 of the signal reproduced from the pre-pit 13 and the amplitude I2 of the signal reproduced from the pre-pit 14 are substantially equal to each other. Therefore, if the signal obtained by detecting the track center is expressed by (I1−I2)/(I1+I2), the value of the signal is substantially equal to 0.

Signals as shown in FIG. 6B are obtained when the signal reproducing beam 10 traces a line 17 located off the center line 11. As shown in FIG. 6B, the line 17 traced by the signal reproducing beam 10 is located closer to the pre-pit 13 than to the pre-pit 14 so that the signal amplitude I1 becomes greater than the signal amplitude I2. Therefore, (I1−I2)/(I1+I2) has a value greater than 0. Thus, the track center can be detected by making the signal equal to 0.

Figure 7A:
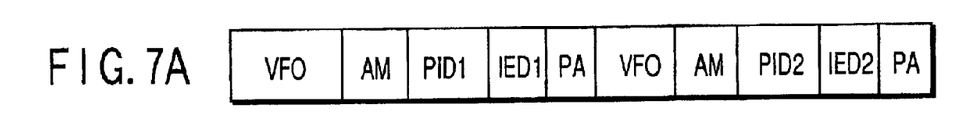
FIG. 7A is a schematic illustration of the layout of ID sections of a known optical disk.
Figure 7B:
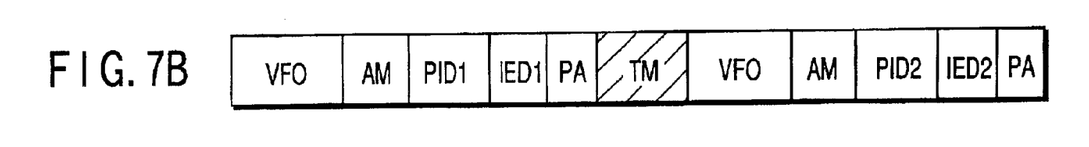
FIGS. 7B and 7C are schematic illustrations of two possible layouts of ID sections of an optical disk according to the invention.
Figure 7C:
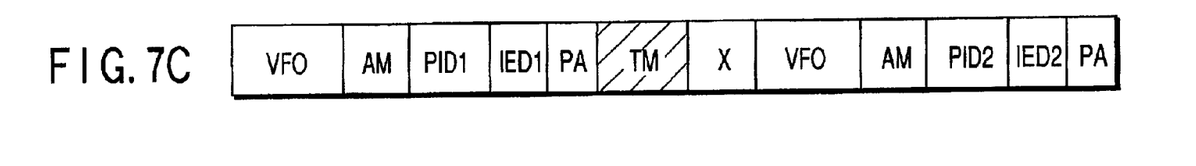

FIGS. 7B and 7C illustrate possible layouts of ID sections of an optical disk according to the invention.

FIG. 7A illustrates a possible layout of ID sections of a known optical disk that is a DVD-RAM. Two PID (physical identification data) sections storing a sector number are arranged respectively at PID1 and PID2. While another sector address is written twice immediately thereafter to produce four PID sections, the remaining two PID sections are not shown in FIG. 7A. A VFO (variable frequency oscillator) field and an AM (address mark) field are arranged before each PID section and an IED (ID error detection code) field and a PA (post amble) field are arranged after it. This arrangement is repeated twice.

Each of the fields will be described below.

The VFO field is used to synchronize the operation of the variable frequency oscillator of the phase synchronizing loop of the read channel bits. The AM field is used to provide the optical disk with byte sync for the next PID field. The PID field has a spare region and stores data including a PID number, a sector type, a layer number and a sector number. The IED (ID error detection code) field is used to detect errors in the data of the PID field. The PA field stores data necessary for completing the last byte of the immediately preceding IED field according to the modulation method specific to it.

As shown in FIG. 7B, a field TM (track center mark) having two wobble pits is arranged between the two PID fields of each ID section of an optical disk according to the invention. Preferably the TM field is located after the first PA field and before the second VFO field from the viewpoint of sorting data, taking the above described contents of each field into consideration.

Note that the position of the field TM for detecting the track center is not limited to the one shown in FIG. 7B and may be placed differently if it is located between the two PIDs. For example, some other field, or field X, may be placed after the TM field as shown in FIG. 7C without adversely affecting the advantages of the present invention.

Figure 8A:
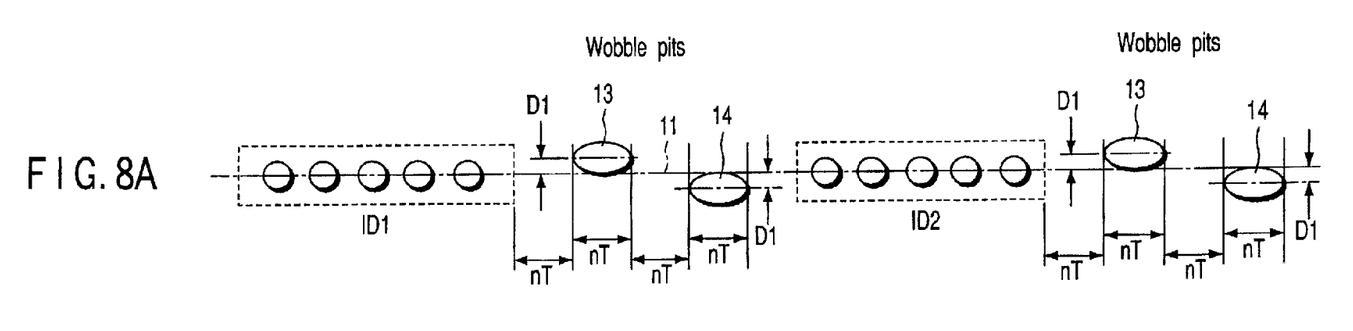
FIGS. 8A and 8B are enlarged schematic illustrations of a principal part of an optical disk according to the invention and the format of pre-pit data.
Figure 8B:
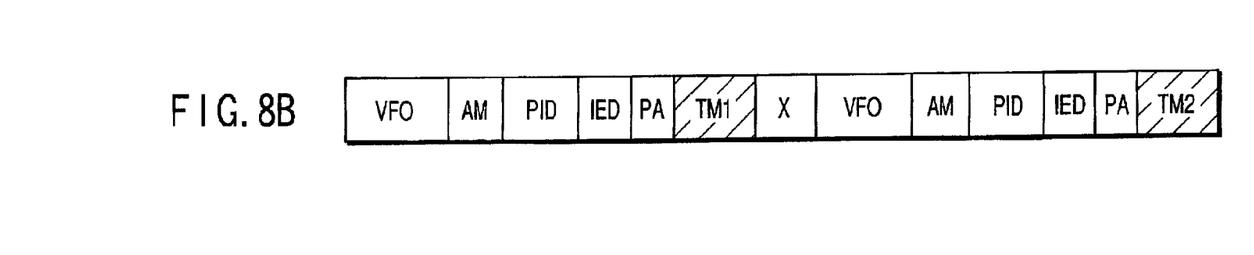

The advantages of the present invention are secured only when the TM field is located between two ID fields. Therefore, additional wobble pits may be arranged after the ID2 as shown in FIG. 8A to secure the advantages of the present invention. FIG. 8B shows the layout of ID sections in such a case. The symmetry of data arrangement may be improved with the layout of FIG. 8B because a TM field is assigned to each PID.

Figure 9:
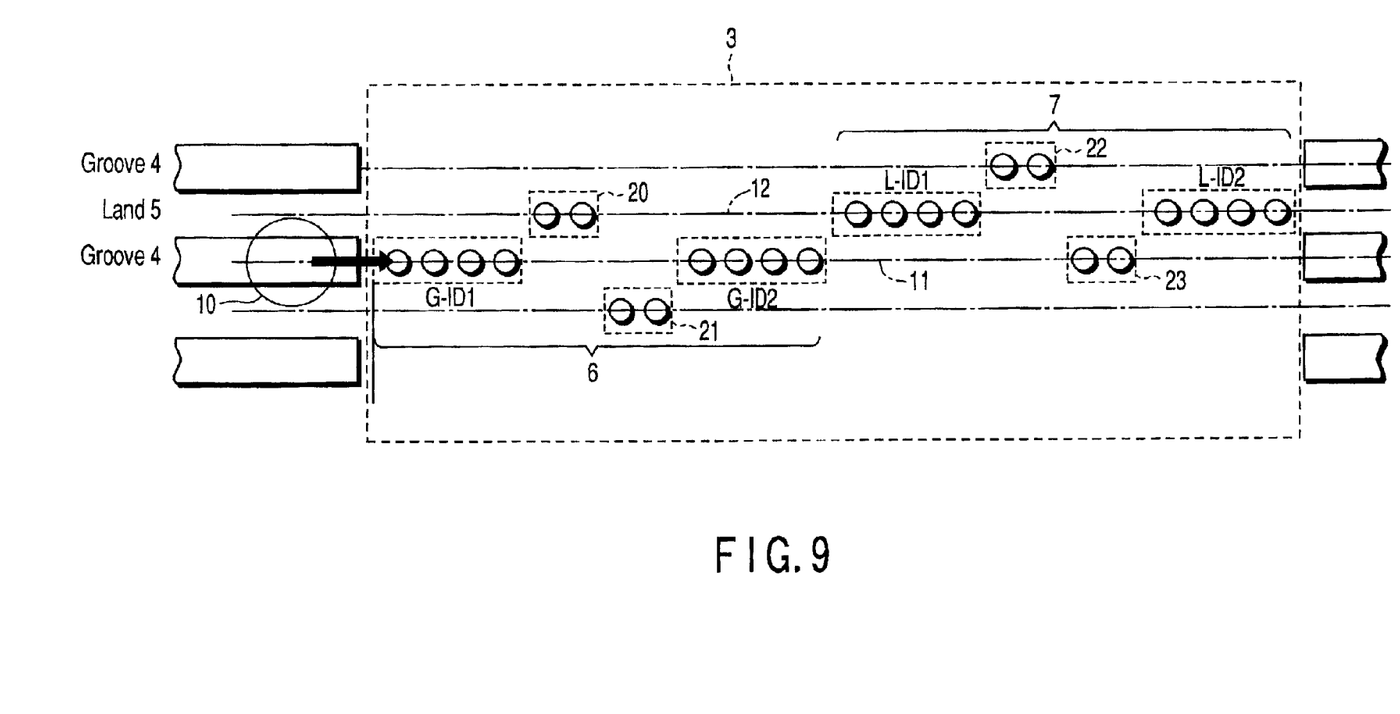
FIG. 9 is an enlarged schematic view of another embodiment of an optical disk according to the invention.

FIG. 9 is a schematic illustration of part of another embodiment of the present invention. Two rows of pits 20 and 21 are arranged respectively on two adjacently located land tracks 5 between the two IDs of the groove ID section 6. Similarly, two rows of pits 22 and 23 are arranged respectively on two adjacently located groove tracks 4 between the two IDs of the land ID section 7.

With this arrangement, the signals of the two rows of pits on the two adjacently located land tracks 5 in the groove ID section 6 are observed as cross talk and therefore the track center can be detected reliably as in the case of the use of wobble pits.

Take one of the groove tracks 4, or the lower groove track 4 in FIG. 9, for example. As a beam 10 traces the center line 11 of the groove track 4, each of the two rows of pre-pits 20, 21 on the adjacently located land tracks 5 gives rise to cross talk. When the amplitudes of the reproduced signals of the cross talk are observed, they are ideally equal to each other because the two rows are displaced from the center line of the groove track 4 to the opposite sides by a distance equal to the pitch of the arrangement of tracks. Then, the difference of the amplitudes of the signals reproduced from the respective rows of pre-pits is substantially equal to 0. It will be appreciated that this arrangement of pre-pits can be reliably used to detect the track center, just like the use of wobble pits.

The rows of wobble pits 20, 21 may store signals that are meaningless. Alternatively, significant information on land tracks such as address information may be stored in the rows of wobble pits 20, 21 because such signals can be reproduced with a sufficiently large amplitude from land tracks.

While the pits are shown to be circular in the drawing, they may alternatively be shown as elliptic, a notched circle, or some other shape without departing from the scope of the present invention.

Now, the timing of detecting wobbles will be briefly described below. The timing of detection of the signals to be reproduced from a row of wobble pits is defined in advance by the format of the header region containing IDs. Therefore, the signals of a row of wobble pits can be caught reliably by defining the timing of operation of the track center detection circuit, which will be described hereinafter, on the basis of the timing of operation of detecting the IDs.

Figure 10:
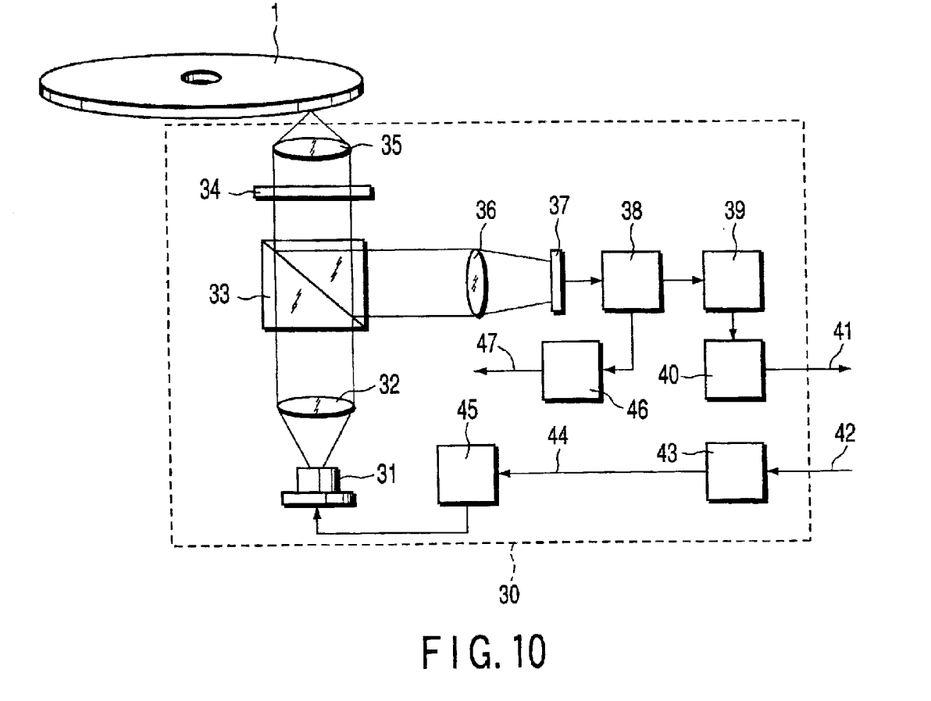
FIG. 10 is a schematic block diagram of an optical disk device according to the invention.

FIG. 10 is a schematic block diagram of an optical disk device for recording information on and reproducing information from an optical disk according to the invention. Referring to FIG. 10, the light beam emitted from a laser beam source 31 is collimated by collimator lens 32 and enters a polarization beam splitter (to be referred to as PBS hereinafter) 33. The beam transmitted through the PBS 33 is then transmitted through a ¼ wave plate 34 and focused on the information recording surface of the optical disk by an objective lens 35.

The focused light beam is controlled by a focus servo tracking servo system in such a way that an optimal micro spot of light is constantly held to the recording surface.

The light beam irradiated onto the optical disk 1 is then reflected by a reflection film or a reflective recording film in the information recording surface. The reflected light beam is then transmitted through the ¼ wave plate 34 and reflected by the PBS 33 because the reflected light beam is polarized perpendicularly relative to the incoming light beam emitted from the laser beam source 31. The light beam reflected by the PBS 33 is converged by a condenser lens 36 and enter a photodetector 37. The flux of light that enters the photodetector 37 is photoelectrically transformed into an electric signal and transmitted to a preamplifier 38. The electric signal is amplified by the preamplifier 38 and processed by a signal processing circuit 39 for equalization, binarization and other operations before it is sent to a demodulation circuit 40. The signal is demodulated by the demodulation circuit 40 corresponding to the modulation method. The demodulation circuit 40 demodulates the input signal, and outputs a reproduced data 41.

For data recording, on the other hand, the data to be recorded 42 is input to a modulation circuit 43 arranged in the optical disk device 30. The modulation circuit 43 modulates the data to be recorded 42 by means of a predetermined modulation method to generate a channel bit data string 44 to be recorded on the disk. The channel bit data string 44 is sent to a recording circuit 45 and transformed into a recording pulse to be used for driving a laser. The recording circuit 45 drives the laser 31 by means of the recording pulse and records a row of recording marks that corresponds to the original data to be recorded on the tracks of the disk 1.

When the converged light beam reproduces wobble pits of a wobble pit section on the optical disk 1, the signal amplified by the preamplifier 38 is a signal as described above by referring to FIGS. 6A and 6B. Then, a track center signal detection circuit 46 detects the signal amplitude I1 by means of the first space section and the pre-pit 13 and also the signal amplitude I2 by means of the second space section and the pre-pit 14 and performs an arithmetic operation of (I1−I2)/(I1+I2). Then, it outputs the outcome of the arithmetic operation as a track center signal 47.

Figure 11:
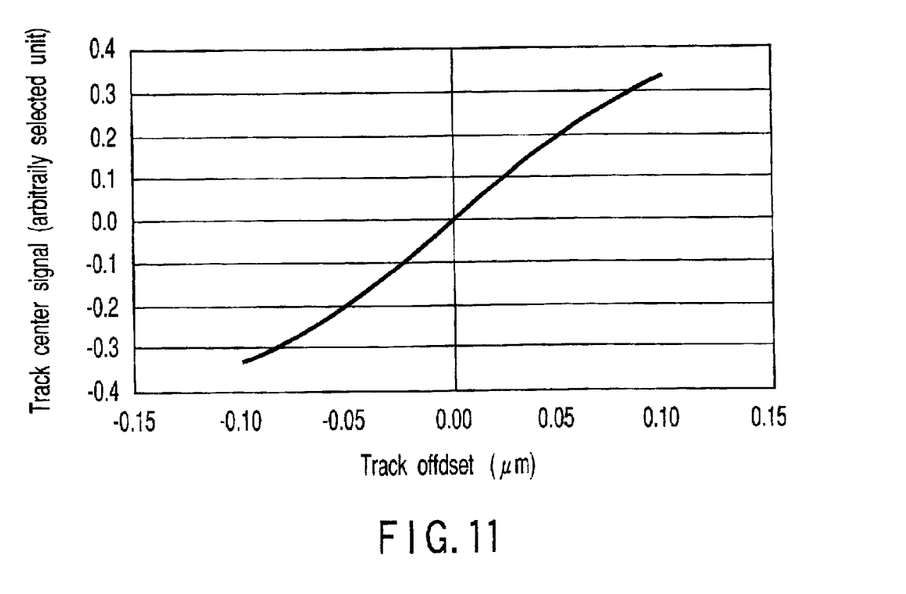
FIG. 11 is a schematic illustration of the relationship between a track center signal obtained by an optical device according to the invention and the displacement of the beam irradiating the track from the track center.

FIG. 11 is a schematic illustration of a track center signal that may be obtained by such an arithmetic operation. In FIG. 11, the horizontal axis represents the displacement of the beam from the track center and the vertical axis represents the track center signal. It will be appreciated that the value of the track center signal becomes equal to 0 on the track center (the original point of the horizontal axis) and varies in direct proportion to the displacement from the center of the track center.

As described above, the present invention provides the disk realized basically by using a method of forming pre-pits in a header field without any offset relative to the signal reproducing beam that is irradiated onto it, in order to secure the signal reproduction reliability, and at the same time, providing the disk with a format that makes it possible to obtain a track center signal for the disk. The present invention provides a disk device adapted to be used with such a disk, and provides a track center detection method that is also adapted to be used for such a disk. The present invention embraces a signal reproducing device, a signal recording device and a signal reproduction method to be used for such a disk.

The present invention is equally applicable to an optical disk, an optical disk reproduction device, an optical disk recording device and an optical disk recording/reproduction device. The present invention is applicable not only to an optical disk but also to a hard disk or a magnetic disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk having tracks and adapted to record information on the tracks and reproduce information from the tracks, said optical disk comprising:

header regions formed by dividing said tracks;

a track center detection section formed in each of said header regions, said track center detection section including a track center detection mark;

two ID sections formed before and after said track center detection section, said two ID sections each having address information.

2. The disk according to claim 1, wherein each of said two ID sections is formed by a row of pre-pits arranged on a center line of said tracks; and said track center detection mark is formed by arranging at least one wobble pit on each of opposite sides of the center line, the wobble pits on the opposite sides having the same length and being displaced from the center line by a same distance.

3. The disk according to claim 2, wherein the wobble pits have a length greater than a minimum mark length defined by a predetermined modulation method for a recording signal.

4. The disk according to claim 2, wherein gaps are provided immediately before or after each of said wobble pits, each of the gaps having a length same as a length of a wobble pit.

5. An optical disk device adapted to reproduce information from an optical disk having tracks, and adapted to record information on the tracks and reproduce information from the tracks, wherein header regions are formed by dividing said tracks, a track center detection section is formed in each of said header regions, respectively, said track center detection section including a track center detection mark, two ID sections are formed to before and after positions of said track center detection section, said two ID sections each having address information, said optical disk device comprising:

means for focusing an optical beam onto a track of said optical disk;

means for detecting an optical beam reflected from said optical disk into an electric signal;

means for detecting a track center signal included in said electric signal corresponding to said track center detection mark; and means for judging a tracking state of the optical beam on the track by using said track center signal.

6. A track center detection method for detecting a track center of an optical disk having tracks and adapted to record information on the tracks and reproduce information from the tracks, wherein header regions are formed by dividing said tracks, a track center detection section is formed in each of said header regions, said track center detection section including a track center detection mark, two ID sections are formed before and after said track center detection section, said two ID sections each having address information, said track center detection method comprising the steps of:

focusing an optical beam onto a track of said optical disk;

transforming an optical beam reflected from said optical disk into an electric signal;

detecting a track center signal included in said electric signal corresponding to said track center detection mark; and judging a tracking state of the optical beam on the track by using said track center signal.

* * * * *